United States Patent
Koyama

(10) Patent No.: US 7,518,984 B2
(45) Date of Patent: Apr. 14, 2009

(54) IP-PBX, IP-PBX SYSTEM, IP TERMINAL CONTROL PROGRAM

(75) Inventor: Junichi Koyama, Tokyo (JP)

(73) Assignee: NEC Corporation, Minato-ku, Tokyo (JP)

(*) Notice: Subject to any disclaimer, the term of this patent is extended or adjusted under 35 U.S.C. 154(b) by 840 days.

(21) Appl. No.: 10/822,733

(22) Filed: Apr. 13, 2004

(65) Prior Publication Data
US 2004/0202153 A1 Oct. 14, 2004

(30) Foreign Application Priority Data
Apr. 14, 2003 (JP) .............................. 2003-108561

(51) Int. Cl.
H04M 7/00 (2006.01)
H04M 1/24 (2006.01)
H04M 3/00 (2006.01)
G01R 31/08 (2006.01)

(52) U.S. Cl. ..................... 370/217; 379/15.01; 379/198; 379/221.04

(58) Field of Classification Search .................. 370/352, 370/356, 217; 379/221.04, 15.01, 198
See application file for complete search history.

(56) References Cited

U.S. PATENT DOCUMENTS

| | | | |
|---|---|---|---|
| 6,584,186 B1* | 6/2003 | Aravamudan et al. | 379/201.03 |
| 6,798,767 B1* | 9/2004 | Alexander et al. | 370/352 |
| 6,801,540 B1* | 10/2004 | Jeong | 370/466 |
| 6,847,634 B1* | 1/2005 | Pearce et al. | 370/352 |
| 7,075,918 B1* | 7/2006 | Kung et al. | 370/352 |
| 7,145,899 B1* | 12/2006 | Pearce et al. | 370/352 |
| 7,212,521 B2* | 5/2007 | Kwon | 370/352 |
| 7,333,472 B2* | 2/2008 | Yang et al. | 370/352 |
| 7,440,566 B2* | 10/2008 | Masuhiro et al. | 379/221.04 |
| 2001/0007555 A1* | 7/2001 | Sasagawa et al. | 370/359 |

(Continued)

FOREIGN PATENT DOCUMENTS

JP 2002-290633 10/2002

(Continued)

Primary Examiner—Fan Tsang
Assistant Examiner—Lisa Hashem
(74) Attorney, Agent, or Firm—McGinn IP Law Group, PLLC

(57) ABSTRACT

An IP-PBX has a software-based built-in control unit, a card slot into which a control card is plugged, and a data bus connecting the software-based control unit and the card slot. The software-based control unit includes a first management unit managing up to a first number of IP terminals, and an IP terminal registering unit connected to the first management unit and the card slot. The control card includes a second management unit managing up to a second number of IP terminals. The IP terminal registering unit compares a current number of IP terminals managed by the first management unit with the first number when an IP terminal requests communication. The IP terminal has an ID number and an IP address. If the current number is smaller than the first number, the IP terminal registering unit associates the first management unit with the ID number and the IP address, and the first management unit manages the IP terminal. If the current number is equal to the first number, the IP terminal registering unit associates the second management unit with the ID number and the IP address, and the second management unit manages the IP terminal.

20 Claims, 9 Drawing Sheets

U.S. PATENT DOCUMENTS

| | | | |
|---|---|---|---|
| 2003/0202508 A1* | 10/2003 | Masuhiro et al. | 370/352 |
| 2003/0202648 A1* | 10/2003 | Masuhiro et al. | 379/242 |
| 2004/0066923 A1* | 4/2004 | Robinson | 379/166 |
| 2004/0160951 A1* | 8/2004 | Galvin et al. | 370/352 |
| 2005/0141483 A1* | 6/2005 | Wengrovitz | 370/352 |
| 2005/0185637 A1* | 8/2005 | Nakamura et al. | 370/352 |
| 2006/0233159 A1* | 10/2006 | Croak et al. | 370/352 |
| 2008/0082858 A1* | 4/2008 | Hasegawa | 714/3 |
| 2008/0232356 A1* | 9/2008 | Masuhiro et al. | 370/354 |

FOREIGN PATENT DOCUMENTS

| | | |
|---|---|---|
| JP | 2002-354116 | 12/2002 |

* cited by examiner

IP-PBX, IP-PBX SYSTEM, IP TERMINAL CONTROL PROGRAM

BACKGROUND OF THE INVENTION

1. Field of the Invention

The present invention relates to an IP-PBX (Internet Protocol Private Branch exchange), an IP-PBX system, and an IP terminal control program executed in the IP-PBX.

2. Description of the Related Art

An IP-PBX is a PBX (Private Branch exchange) supporting IP (Internet Protocol) communication. An IP-PBX system is known, in which an IP terminal such as an IP phone and a personal computer carries out IP communication by using the IP-PBX through a local area network (LAN).

Japanese Laid Open Patent Application (JP-P2002-290633A) discloses an exchange used for an IP terminal carrying out IP communication through a private line or the Internet. The exchange has an identifying unit, a rate calculating unit, a rate information storing unit, and a notifying unit. When this exchange (receiving site) receives a request for IP communication from another exchange (initiating site), the identifying unit identifies an IP address of the other exchange based on the IP address included in the request. When an IP terminal accommodated by the other exchange carries out IP communication by using the line connected to the exchange of the receiving site, the rate calculating unit calculates the rate of the IP communication. Here, the rate of the IP communication is calculated for every IP address identified by the identifying unit. The rate information storing unit stores information about the rate calculated by the rate calculating unit for every IP address. The notifying unit notifies the other exchange (initiating site) of the information about the rate stored in the rate information storing unit.

Japanese Laid Open Patent Application (JP-P2002-354116A) discloses a virtual private branch exchange. The virtual private branch exchange includes exchanges provided by communication providers, WANs (Wide Area Networks), LANs (Local Area Networks), communication line networks, local phones, subscriber's telephone stations, and a call control apparatus. The call control apparatus treats the local phones and the subscriber's telephone stations as extension phones, and provides voice communication and a variety of extension services for the local phones and the subscriber's telephone stations.

In the conventional IP-PBX system, an IP terminal management unit carries out the functions of interface (e.g. protocol conversion) between exchange control software and IP terminals. There are two methods to achieve the management of the IP terminals, "card mode" and "built-in software mode". In an IP-PBX system for the "card mode", an IP terminal control card plugged into a card slot manages the IP terminals. In an IP-PBX system for the "built-in software mode", a software-based IP terminal management unit manages the IP terminals, executed by a central processing unit.

According to the IP-PBX system for the "card mode", a plurality of IP terminal control cards are plugged into different card slots. When an IP phone logs in to the IP-PBX system, the exchange control software selects one IP terminal management unit to be used for managing the IP phone, and stores a port number associated with the one IP terminal management unit. When the exchange control software transmits a control signal to an IP phone, the exchange control software designates a port number associated with an IP terminal management unit managing the IP phone.

According to the IP-PBX system for the "built-in software mode", only one IP terminal management unit operates in that system. Therefore, when an IP phone logs in to the IP-PBX system, the IP terminal management unit to be used for managing the IP phone can be determined uniquely. A control signal for controlling the IP phone is transferred to the one IP terminal management unit.

It is not possible to merely combine an IP-PBX system for the "card mode" with an IP-PBX system for the "built-in software mode", because there is no way to specify the IP terminal management unit for the "built-in software mode". That is to say, when an IP phone logs in to such an IP-PBX system, the IP terminal management unit for the "built-in software mode" can not be selected.

Also, when trying to expand IP phones in an IP-PBX system for the "built-in software mode" and the number of the IP phones being larger than the capacity of the IP terminal management unit, an IP-PBX system for the "card mode" must be introduced in place of the IP-PBX system for the "built-in software mode". It is necessary to prepare IP terminal control cards which manage not only the expanded IP phones but also IP phones originally managed by the IP terminal management unit for the "built-in software mode".

SUMMARY OF THE INVENTION

An object of the present invention is to provide an IP-PBX, an IP-PBX system, and an IP terminal control program which can support both "card mode" and "built-in software mode".

Another object of the present invention is to provide an IP-PBX, an IP-PBX system, and an IP terminal control program in which manageable IP terminals can be expanded.

In an aspect of the present invention, an IP-PBX (Internet Protocol Private Branch eXchange) system includes an IP-PBX, a plurality of IP (Internet Protocol) terminals, and a network such as a LAN (Local Area Network) which connects the IP-PBX and the plurality of IP terminals. The IP terminal includes an IP phone.

The IP-PBX has a software-based built-in control unit, at least one card slot into which a control card is plugged, and a data bus connecting the software-based built-in control unit and the card slot. The software-based built-in control unit includes a first management unit managing up to a first number of IP terminals, and an IP terminal registering unit connected to the first management unit and the card slot. Both the first management unit and the IP terminal registering unit are connected to the network. The control card includes a second management unit which manages up to a second number of IP terminals and is connected to the network.

When one of the plurality of IP terminals requests communication, the IP terminal registering unit compares a current number of IP terminals managed by one of the first management unit and the second management unit with corresponding one of the first number and the second number. Here, the one IP terminal has an ID number and an IP address.

If the current number is smaller than the one number, the IP terminal registering unit associates the one management unit with the ID number and the IP address. Then, the one management unit manages the one IP terminal.

If the current number is equal to the one number, the IP terminal registering unit associates another of the first management unit and the second management unit with the ID number and the IP address. Then, the other management unit manages the one IP terminal.

For example, the IP terminal registering unit compares a current number of IP terminals managed by the first management unit with the first number when an IP terminal requests communication. If the current number is smaller than the first number, the IP terminal registering unit associates the first management unit with the ID number and the IP address, and the first management unit manages the IP terminal. If the current number is equal to the first number, the IP terminal registering unit associates the second management unit with the ID number and the IP address, and the second management unit manages the IP terminal.

On the other hand, the IP terminal registering unit may compare a current number of IP terminals managed by the second management unit with the second number when an IP terminal requests communication. If the current number is smaller than the second number, the IP terminal registering unit associates the second management unit with the ID number and the IP address, and the second management unit manages the IP terminal. If the current number is equal to the second number, the IP terminal registering unit associates the first management unit with the ID number and the IP address, and the first management unit manages the IP terminal.

When the one management unit mentioned above manages the IP terminal, the one management unit stores an IP address translation data indicative of relation between the ID number and the IP address of the IP terminal. On the other hand, when the other management unit mentioned above manages the IP terminal, the other management unit stores an IP address translation data indicative of relation between the ID number and the IP address of the IP terminal.

The software-based built-in control unit can further include a main telephony unit and a port selecting unit. The port selecting unit is connected to the main telephony unit, the one management unit and the other management unit (first and second management unit).

The main telephony unit generates a control signal which controls the IP terminal. Here, the ID number is specified in the control signal. The main telephony unit transmits the control signal to the port selecting unit. Based on the ID number specified in the control signal, the port selecting unit checks which of the one management unit and the other management unit is managing the IP terminal. Then, the port selecting unit transfers the control signal to a management unit which is managing the IP terminal. Then, the management unit retrieves the IP address of the IP terminal from the IP address translation data by using the ID number specified in the control signal. Then, the management unit transmits the control signal to the IP terminal according to the retrieved IP address.

Also, the IP terminal may transmit a signal to the management unit which is managing the IP terminal. Here, the IP address of the IP terminal is specified in the signal. The management unit retrieves the ID number of the IP terminal from the IP address translation data by using the IP address specified in the signal, and incorporates the retrieved ID number in the signal. Then, the management unit transmits the signal to the main telephony unit through the port selecting unit. The main telephony unit carries out processing with regard to the IP terminal according to the ID number specified in the signal.

The procedures in the IP-PBX mentioned above may be described in a set of computer programs, which are executed by a computer.

As described above, the IP-PBX, the IP-PBX system and the IP terminal control program according to the present invention can support both the "card mode" and the "built-in software mode". For example, when the number of the IP terminals is small or the traffic is light at the time of the introduction of this IP-PBX system, the IP-PBX system can operate only in the "built-in software mode". When the number of the IP terminals and the traffic increase, the IP-PBX system can be extended by plugging an additional IP terminal control card into an empty card slot.

Moreover, according to the present invention, it is the port selecting unit that detects which management unit (first or second) manages an IP terminal. Therefore, the main telephony unit is able to operate without regard to the management unit which is managing the IP terminal. Thus, the service upgrading or the service addition can be achieved by merely modifying the program which controls the operation of the main telephony unit.

DESCRIPTION OF THE PREFERRED EMBODIMENTS

Embodiments of the present invention will be described below with reference to the attached drawings.

Figure 1:
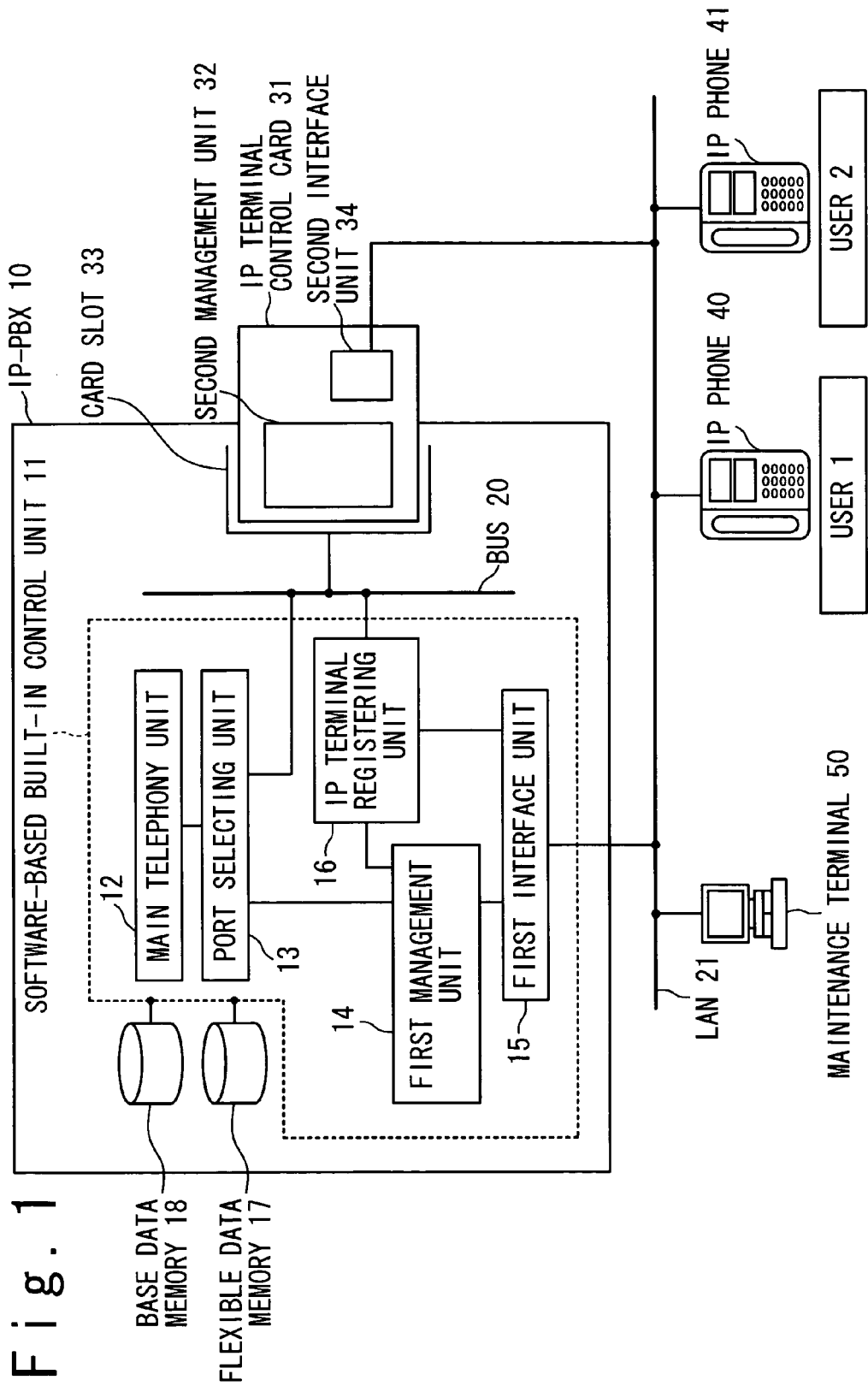
FIG. 1 shows a configuration of an IP-PBX system according to an embodiment of the present invention.

FIG. 1 shows a configuration of an IP-PBX system according to an embodiment of the present invention. In FIG. 1, the IP-PBX system includes an IP-PBX 10 which is an private branch exchange supporting IP communication, IP phones 40 and 41 as examples of IP terminals with IP communication facility, and a local area network (LAN) 21 connecting the IP-PBX 10 and the IP phones 40 and 41. Communication of data such as voice data is possible between the IP-PBX 10 and the IP phones 40, 41 by the use of IP packets. Also connected to the LAN 21 is a maintenance terminal 50 to be hereinafter described. It should be noted that connection to an external line wire is omitted in FIG. 1.

In the IP-PBX system, an telephone extension is not assigned to each line but to each IP phone (or user). That is to say, extensions are respectively assigned to the IP phones 40 and 41 themselves, and the IP phones 40 and 41 have their own extension IDs (terminal IDs) associated with their respective extension numbers.

The IP-PBX 10 has a software-based built-in control unit 11, at least one card slot 33 into which an IP terminal control card 31 is plugged, and a data bus 20 connecting the software-based built-in control unit 11 and the card slot 33. The software-based built-in control unit 11 is operated by a central processing unit (CPU). Data is transferred between the software-based built-in control unit 11 and the IP terminal control card 31 through the data bus 20. Furthermore, the IP-PBX 10 has a flexible data memory 17 and a base data memory 18.

The software-based built-in control unit 11 includes a main telephony unit 12, a port selecting unit 13, a first management unit 14, a first interface unit 15, and an IP terminal registering unit 16.

The main telephony unit 12 carries out exchange procedures such as call control and connection control based on an extension ID associated with an extension of an IP phone (a user). The main telephony unit 12 generates a control signal to be transmitted to an address designated by an extension ID, and transfers the control signal to the port selecting unit 13.

The port selecting unit 13 is between the main telephony unit 12 and a plurality of management units including the first management unit 14 and a second management unit 32 to be hereinafter described. Based on the control signal from the main telephony unit 12, the port selecting unit 13 checks which management unit is managing the IP phone (first management unit 14 or second management unit 32). Thus, the port selecting unit 13 sorts the above-mentioned control signals into the plurality of management units as appropriate.

The first management unit 14 is connected to the port selecting unit 13. The first management unit 14 stores an IP address translation data indicative of the relation between an extension ID and an IP address of an IP terminal, and translates the extension ID and the IP address. The first interface unit 15 is connected to the first management unit 14, and the software-based built-in control unit 11 connects to the LAN 21 via this first interface unit 15.

The IP terminal registering unit 16 is connected to the first management unit 14 and the first interface unit 15. The IP terminal registering unit 16 is also connected to the second management unit 32 through the data bus 20. This IP terminal registering unit 16 determines which management unit (14, 32) should manage an IP phone as hereinafter described.

The IP terminal control card 31 has the second management unit 32 and a second interface unit 34 connected to the second management unit 32. The IP terminal control card 31 and hence the software-based built-in control unit 11 connect to the LAN 21 via this second interface unit 34. The second management unit 32 stores an IP address translation data indicative of the relation between an extension ID and an IP address of an IP terminal, and translates the extension ID and the IP address.

Figure 2:
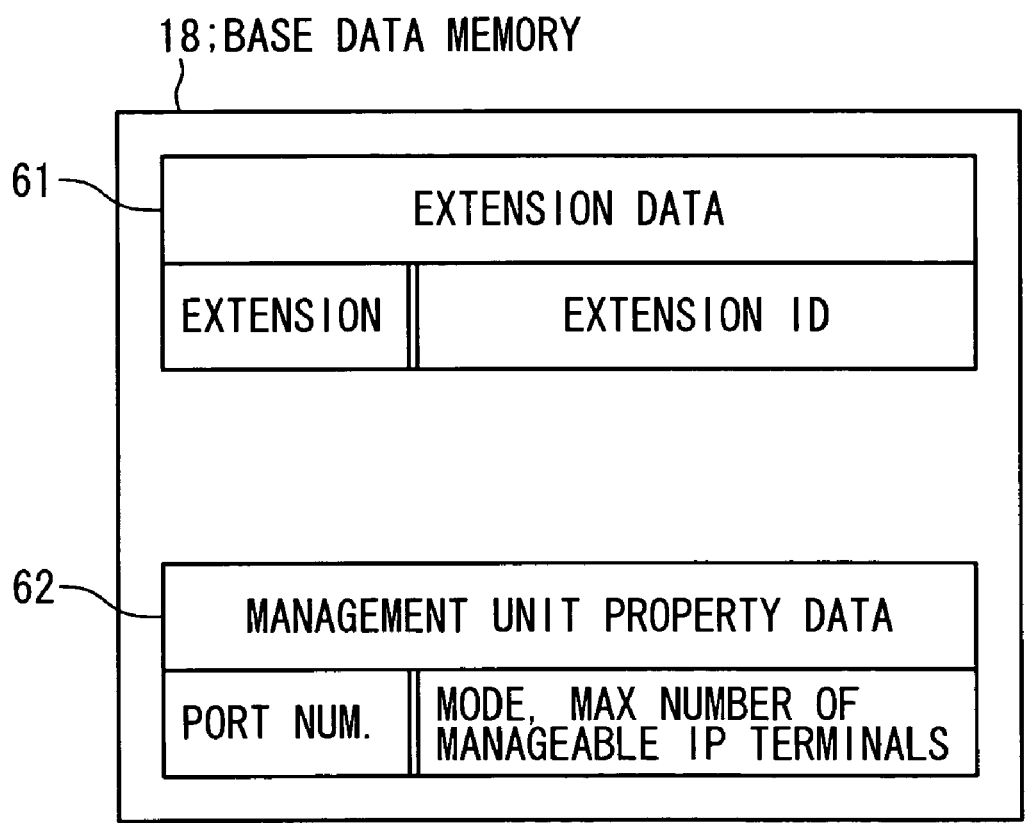
FIG. 2 shows data stored in a base data memory according to an embodiment of the present invention.

FIG. 2 shows contents of the base data memory 18. The base data memory 18 stores basic data for this IP-PBX system. The basic data are set to the base data memory 18 by using the maintenance terminal 50 and so on, and are not changed automatically during the operation of the IP-PBX system. As shown in FIG. 2, the basic data include an extension data 61 and a management unit property data 62. A telephone extension number (hereinafter, merely referred to as an extension) and the corresponding extension ID is stored as the extension data 61. In other words, the extension data 61 indicates the extension IDs in relationship to the respective extensions. Stored as the management unit property data 62 are a port number of a management unit (14, 32), a mode of the corresponding management unit, and a maximum number of IP terminals which can be managed by the corresponding management unit. Here, the "mode" indicates the "built-in software mode" or the "card mode". Also, the maximum number may be a first number and a second number, i.e., the first and the second management unit 14 and 32 manage up to the first and the second number of IP phones (IP terminals), respectively. This management unit property data 62 indicates the modes and the maximum numbers in relationship to the respective port numbers of the management units.

Figure 3:
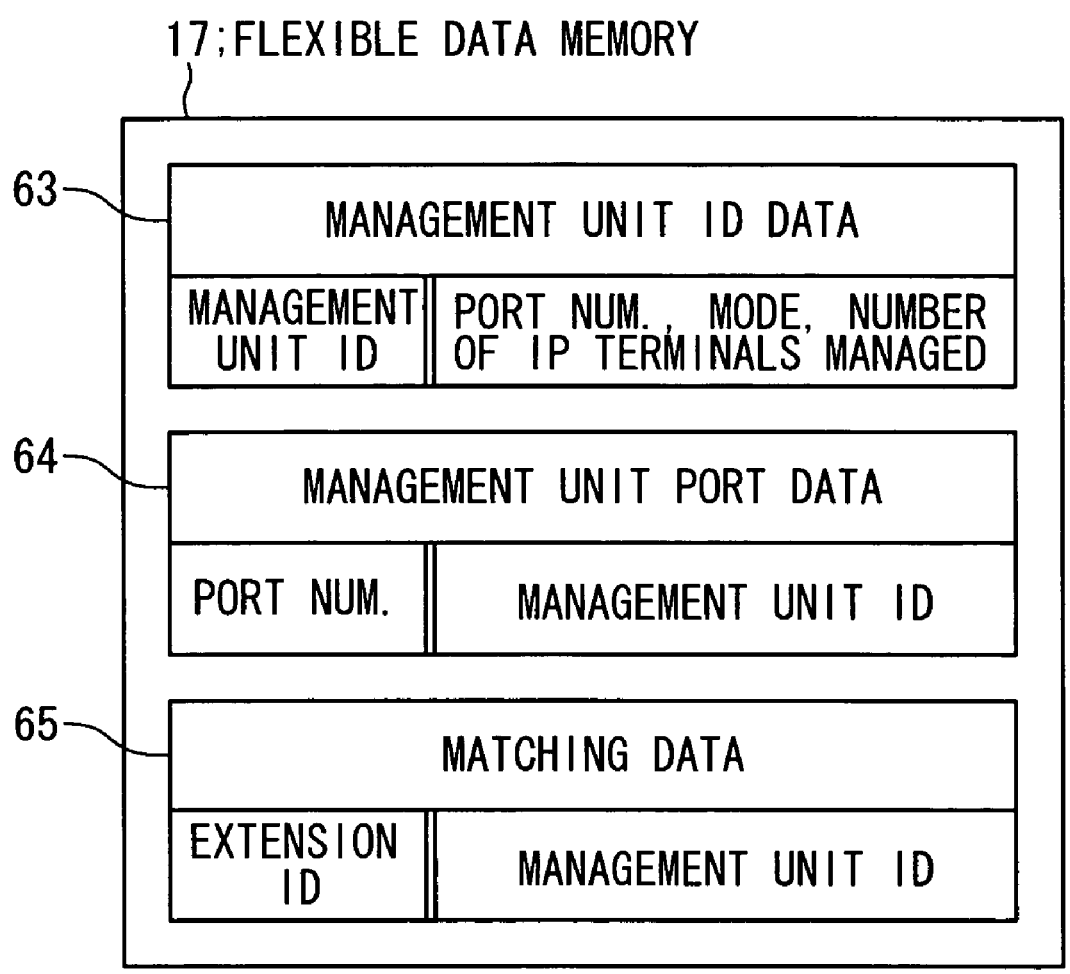
FIG. 3 shows data stored in a flexible data memory according to an embodiment of the present invention.

FIG. 3 shows contents of the flexible data memory 17. The flexible data memory 17 stores data which are updated automatically according to changes in states of IP phones 40 and 41. As shown in FIG. 3, stored in the flexible data memory 17 are a management unit ID data 63, a management unit port data 64, and a matching data 65. The management unit ID data 63 indicates the port numbers, the modes, and the numbers of IP terminals (IP phones) currently managed in relationship to management unit IDs of the respective management units. Here, these management unit IDs are assigned to management units (14, 32) by the IP terminal registering unit 16, as described later. The management unit port data 64 indicates the management unit IDs in relationship to the respective port numbers of the management units. Also, the matching data 65 indicates the management unit IDs in relationship to the respective extension IDs associated with extensions, as described later.

The above-mentioned IP-PBX system according to the present embodiment supports both the "card mode" and the "built-in software mode". How the IP-PBX system supports both modes will be described below.

First, the basic data is set to the base data memory 18 by using the maintenance terminal 50. That is to say, the extensions and the corresponding extension IDs are stored as the extension data 61 in the base data memory 18 (see FIG. 2). Also, the port numbers of management units (14, 32), modes of the corresponding management units, and the maximum numbers are stored as the management unit property data 62 in the base data memory 18 (see FIG. 2). In the case of the second management unit 32, the port number indicates a port number of the card slot 33 into which the IP terminal control card 31 is plugged, and the mode indicates the "card mode". In the case of the first management unit 14, the port number indicates a port number of an empty card slot, and the mode indicates the "built-in software mode".

After the setting of the management unit property data 62, the IP terminal registering unit 16 assigns ID numbers (management unit IDs) to respective of the first management unit 14 and the second management unit 32. Then, the IP terminal registering unit 16 writes the management unit ID data 63 into the flexible data memory 17 by referring to the management unit property data 62. That is, the IP terminal registering unit 16 writes the port numbers, the modes, and the numbers of the managing IP terminals in relationship to the corresponding management unit IDs as shown in FIG. 3. Here, the initial value of each number of the managing IP terminals is set to zero. Also, the IP terminal registering unit 16 writes the management unit port data 64 into the flexible data memory 17. That is, the IP terminal registering unit 16 writes the management unit IDs in relationship to the corresponding port numbers.

Now, let us consider a situation that a user 1 is going to log-in the IP-PBX 10 by using the IP phone 40, in which the IP phone 40 has its unique extension, extension ID and IP address. In this case, the IP phone 40 transmits a login-request signal to the first interface unit 15 of the software-based built-in control unit 11. This login-request signal indicates the extension of the IP phone 40 (user 1) and the IP address of the IP phone 40. The login-request signal is transferred to the IP terminal registering unit 16 through the first interface unit 15. Then, based on the port number of the first management unit 14, the IP terminal registering unit 16 retrieves the corresponding management unit ID from the management unit port data 64 stored in the flexible data memory 17 (see FIG. 3).

Next, based on the retrieved management unit ID, the IP terminal registering unit 16 retrieves a current number of IP terminals managed by the first management unit 14 from the management unit ID data 63 stored in the flexible data memory 17. Also, based on the port number, the IP terminal registering unit 16 retrieves the maximum number of IP terminals which can be managed by the first management unit 14 (first number) from the management unit property data 62 stored in the based data memory 18. Then, the IP terminal registering unit 16 compares the current number with the maximum number (first number).

If the current number is smaller than the first number, the first management unit 14 is considered to be able to manage the IP phone 40, and the IP terminal registering unit 16 updates the management unit ID data 63 by adding 1 to the current number. Also, based on the extension of the IP phone 40 (user 1), the IP terminal registering unit 16 retrieves the extension ID of the IP phone 40 from the extension data 61 stored in the base data memory 18. Then, the IP terminal registering unit 16 writes the retrieved extension ID and the management unit ID of the first management unit 14 as the matching data 65 into the flexible data memory 17 as shown in FIG. 3. Thus, the IP phone 40 is registered in the first management unit 14.

If the current number is equal to the first number, the IP phone 40 can not be registered in the first management unit 14. Then, based on the port number of the second management unit 32, the IP terminal registering unit 16 retrieves the corresponding management unit ID from the management unit port data 64 stored in the flexible data memory 17. This management unit ID is associated with the second management unit 32.

Next, based on the retrieved management unit ID, the IP terminal registering unit 16 retrieves a current number of IP terminals managed by the second management unit 32 from the management unit ID data 63 stored in the flexible data memory 17. Also, based on the port number, the IP terminal registering unit 16 retrieves the maximum number of IP terminals which can be managed by the second management unit 32 (second number) from the management unit property data 62 stored in the based data memory 18. Then, the IP terminal registering unit 16 compares the current number with the maximum number (second number).

If the current number associated with the second management unit 32 is smaller than the second number, the second management unit 32 is considered to be able to manage the IP phone 40, and the IP terminal registering unit 16 updates the management unit ID data 63 by adding 1 to the current number. Also, based on the extension of the IP phone 40 (user 1), the IP terminal registering unit 16 retrieves the extension ID of the IP phone 40 from the extension data 61 stored in the base data memory 18. Then, the IP terminal registering unit 16 writes the retrieved extension ID and the management unit ID of the second management unit 32 as the matching data 65 into the flexible data memory 17 as shown in FIG. 3. Thus, the IP phone 40 is registered in the second management unit 32.

If the current number associated with the second management unit 32 is equal to the second number, the similar procedure is executed for another second management unit 32. If there is no second management unit 32 (IP terminal control card 31) available, the login procedure for the IP phone 40 ends in failure. Then, the error signal indicative of the login failure is transferred to the IP phone 40, and the login failure is notified to the user 1.

After the designation of a management unit (14, 32) which manages the IP phone 40, the IP address translation data is generated by the designated management unit.

When the first management unit 14 manages the IP phone 40, the IP terminal registering unit 16 transfers the extension ID and the IP address of the IP phone 40 to the first management unit 14. The first management unit 14 generates the IP address translation data indicative of the relation between the extension ID and the IP address of the IP phone 40.

When the second management unit 32 manages the IP phone 40, the IP terminal registering unit 16 transfers the extension ID and the IP address of the IP phone 40 to the second management unit 32 through the data bus 20. The second management unit 32 generates the IP address translation data indicative of the relation between the extension ID and the IP address of the IP phone 40.

Then, the designated management unit (14 or 32) transmits a signal indicative of success of the login procedures to the IP phone 40, and the login success is notified to the user 1. When receiving that signal, the IP phone 40 stores an IP address of the source of the signal (interface unit) as a destination IP address. This destination IP address is used when the IP phone 40 transmits control signals to the IP-PBX 10.

In this manner, the extension of the IP phone 40 (user 1), the IP address of the IP phone 40, and the management unit managing the IP phone 40 are associated with each other. Thus, the user 1 becomes able to use the IP phone 40 in this IP-PBX system according to the present embodiment.

Next, procedures for transmitting a control signal from the main telephony unit 12 to the IP phone 40 of the user 1 will be described below. First, the main telephony unit 12 generates a control signal in which the extension ID of the IP phone 40 is specified, and transfers the control signal to the port selecting unit 13. Based on the specified extension ID, the port selecting unit 13 retrieves the management unit ID from the matching data 65 stored in the flexible data memory 17. Then, based on the retrieved management unit ID, the port selecting unit 13 retrieves the mode and the port number of the management unit from the management unit ID data 63 stored in the flexible data memory 17.

If the "mode" indicates the "built-in software mode", the port selecting unit 13 transfers the control signal received from the main telephony unit 12 to the first management unit 14 by referring to the retrieved port number. Based on the extension ID specified in the control signal, the first management unit 14 retrieves the IP address of the IP phone 40 from the IP address translation data associated with the first management unit 14. Then, the first management unit 14 transmits the control signal to the retrieved IP address (IP phone 40) through the first interface unit 15 and the LAN 21.

If the "mode" indicates the "card mode", the port selecting unit 13 transfers the control signal to the second management unit 32 through the data bus 20 by referring to the retrieved port number. Based on the extension ID specified in the control signal, the second management unit 32 retrieves the IP address of the IP phone 40 from the IP address translation data associated with the second management unit 32. Then, the second management unit 32 transmits the control signal to the retrieved IP address (IP phone 40) through the second interface unit 34 and the LAN 21.

Next, procedures for transmitting a control signal from the IP phone 40 of the user 1 to the main telephony unit 12 will be described below. First, the IP phone 40 transmits a control signal to the address indicated by the destination IP address which has been stored at the time of the login as mentioned above.

When the first management unit 14 manages the IP phone 40, the IP phone 40 transmits the control signal to the first management unit 14 through the first interface unit 15. Based on the IP address of the IP phone 40, the first management unit 14 retrieves the extension ID from the IP address translation data. Then, the first management unit 14 incorporates the retrieved extension ID in the control signal, and transfers the control signal to the port selecting unit 13.

When the second management unit 32 manages the IP phone 40, the IP phone 40 transmits the control signal to the second management unit 32 through the second interface unit 34. Based on the IP address of the IP phone 40, the second management unit 32 retrieves the extension ID from the IP address translation. Then, the second management unit 32 incorporates the retrieved extension ID in the control signal, and transfers the control signal to the port selecting unit 13.

The port selecting unit 13 receives the control signal from the first management unit 14 or the second management unit 32, and transfers the control signal to the main telephony unit 12. When receiving the control signal, the main telephony unit 12 carries out processing with regard to the extension of the IP phone 40 (user 1).

As described above, the IP-PBX 10 and the IP-PBX system according to the present invention can support both the "card mode" and the "built-in software mode". In other words, operation in the "card mode" and the "built-in software mode" can be achieved in an identical IP-PBX 10 and hence in an identical IP-PBX system.

In the description above, the IP terminal registering unit 16 first tries to have the first management unit 14 manage the IP phone 40. The IP terminal registering unit 16 can try to have the second management unit 32 manage the IP phone 40 first. In other words, the priority can be given to either the first management unit 14 or the second management unit 32. In the case when the priority is given to the second management unit 32, similar procedures can be carried out in the IP-PBX system according to the present invention.

Next, operations of the IP-PBX system according to an embodiment of the present invention will be described with reference to flow charts shown in FIGS. 4 to 6.

First, the basic data are set to the base data memory 18 by using the maintenance terminal 50. That is to say, the extensions and the corresponding extension IDs are stored as the extension data 61 in the base data memory 18 (Step A1 in FIG. 4). Also, the port numbers of management units, modes of the corresponding management units, and the maximum numbers are stored as the management unit property data 62 in the base data memory 18 (Step A2 in FIG. 4).

In the case of the second management unit 32, the port number indicates a port number of the card slot 33 into which the IP terminal control card 31 is plugged, and the mode indicates the "card mode". In the case of the first management unit 14, the port number indicates a port number of an empty card slot, and the mode indicates the "built-in software mode". After setting the base data, the maintenance terminal 50 transmits a signal indicative of the completion of setting the base data to the IP terminal registering unit 16 of the software-based built-in control unit 11 via the LAN 21 (Step A3 in FIG. 4).

Figure 4:
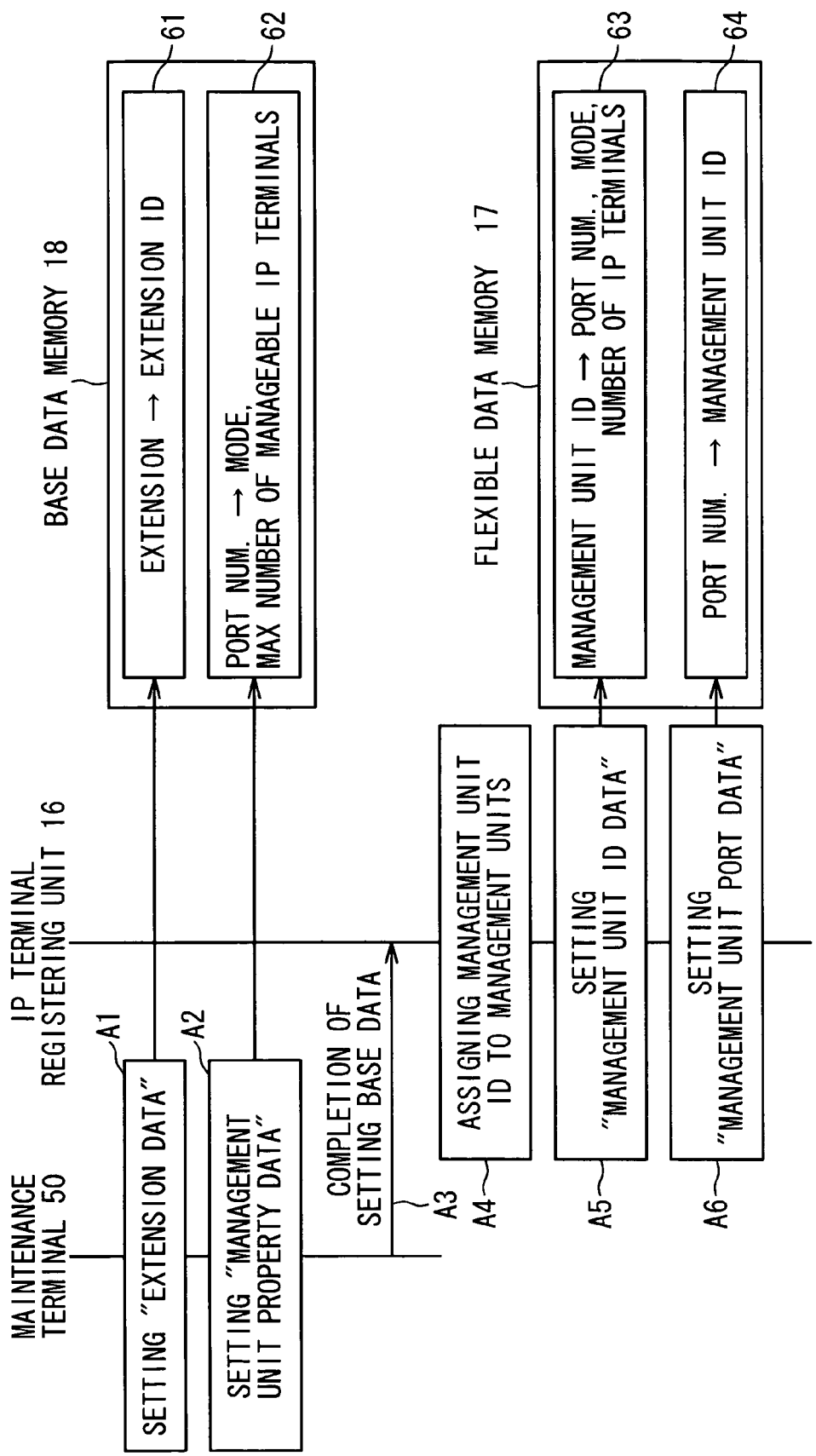
FIG. 4 is a flow chart showing an operation of the IP-PBX system according to an embodiment of the present invention.

When receiving the signal from the maintenance terminal 50, the IP terminal registering unit 16 assigns management unit IDs to respective of the first management unit 14 and the second management unit 32 (Step A4 in FIG. 4). Then, the IP terminal registering unit 16 writes the management unit ID data 63 into the flexible data memory 17 by referring to the management unit property data 62. That is, the IP terminal registering unit 16 writes the port numbers, the modes, and the numbers of the managing IP terminals in relationship to the corresponding management unit IDs as shown in FIG. 3 (Step A5 in FIG. 4). Here, the initial value of each number of the managing IP terminals is set to zero. Also, the IP terminal registering unit 16 writes the management unit port data 64 into the flexible data memory 17. That is, the IP terminal registering unit 16 writes the management unit IDs in relationship to the corresponding port numbers (Step A6 in FIG. 4).

Figure 5:
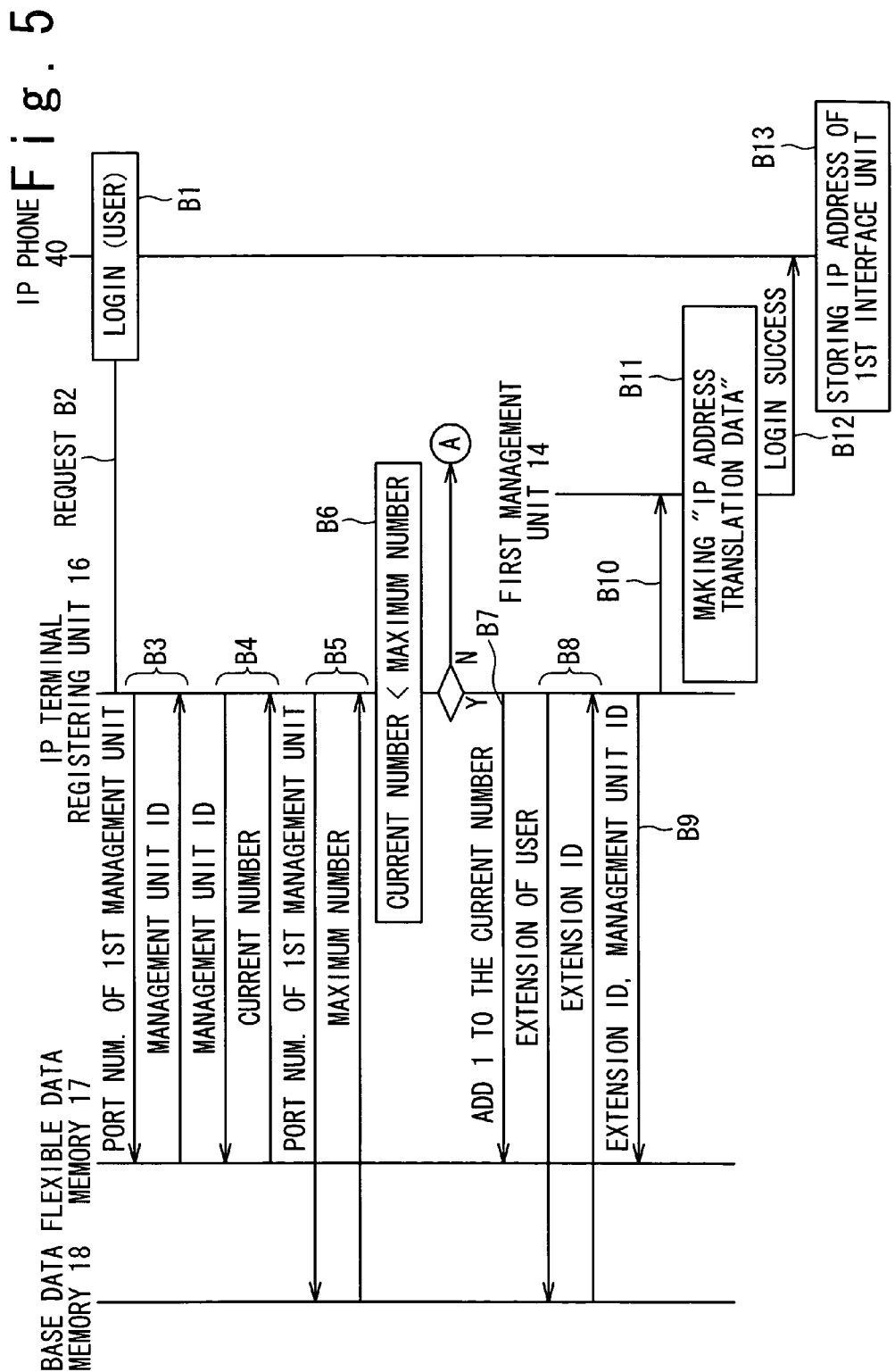
FIG. 5 is a flow chart showing another operation of the IP-PBX system according to an embodiment of the present invention.

Next, a user 1 tries to log-in the IP-PBX 10 by using the IP phone 40, in which the IP phone 40 has its unique extension, extension ID and IP address (Step B1 in FIG. 5). In this case, the IP phone 40 transmits a login-request signal to the IP terminal registering unit 16 through the first interface unit 15 (Step B2 in FIG. 5). This login-request signal indicates the extension of the IP phone 40 (user 1) and the IP address of the IP phone 40.

Then, based on the port number of the first management unit 14, the IP terminal registering unit 16 retrieves the corresponding management unit ID from the management unit port data 64 stored in the flexible data memory 17 (Step B3 in FIG. 5). Next, based on the retrieved management unit ID, the IP terminal registering unit 16 retrieves a current number of IP terminals managed by the first management unit 14 from the management unit ID data 63 stored in the flexible data memory 17 (Step B4 in FIG. 5). Next, based on the port number of the first management unit 14, the IP terminal registering unit 16 retrieves the maximum number of IP terminals which can be managed by the first management unit 14 (first number) from the management unit property data 62 stored in the based data memory 18 (Step B5 in FIG. 5). Then, the IP terminal registering unit 16 compares the current number with the first (maximum) number (Step B6 in FIG. 5).

If the current number is smaller than the first number (Step B6; Yes), the first management unit 14 is considered to be able to manage the IP phone 40, and the IP terminal registering unit 16 updates the management unit ID data 63 by adding 1 to the current number (Step B7 in FIG. 5). Next, based on the extension of the IP phone 40 (user 1), the IP terminal registering unit 16 retrieves the extension ID of the IP phone 40 from the extension data 61 stored in the base data memory 18 (Step B8 in FIG. 5). Then, the IP terminal registering unit 16 writes the retrieved extension ID and the management unit ID of the first management unit 14 as the matching data 65 into the flexible data memory 17 (Step B9 in FIG. 5). Thus, the IP phone 40 is registered in the first management unit 14.

Then, the IP terminal registering unit 16 transfers the extension ID and the IP address of the IP phone 40 to the first management unit 14 (Step B10 in FIG. 5). The first management unit 14 writes the extension ID and the IP address of the IP phone 40 into the flexible data memory 17 as the IP address translation data associated with the first management unit 14 (Step B11 in FIG. 5). Then, the first management unit 14 transmits a signal indicative of success of the login procedures to the IP phone 40 (Step B12 in FIG. 5).

When receiving that signal, the IP phone 40 stores an IP address of the source of the signal (the first interface unit 15) as a destination IP address (Step B13 in FIG. 5). This destination IP address is used when the IP phone 40 transmits control signals to the IP-PBX 10. Thus, the first management unit 14 becomes able to manage the IP phone 40.

On the other hand, if the current number is equal to the first number (Step B6; No), the IP phone 40 can not be registered in the first management unit 14. Then, based on the port number of the second management unit 32, the IP terminal registering unit 16 retrieves the corresponding management unit ID from the management unit port data 64 stored in the flexible data memory 17 (Step B14 in FIG. 6). This management unit ID is associated with the second management unit 32.

Figure 6:
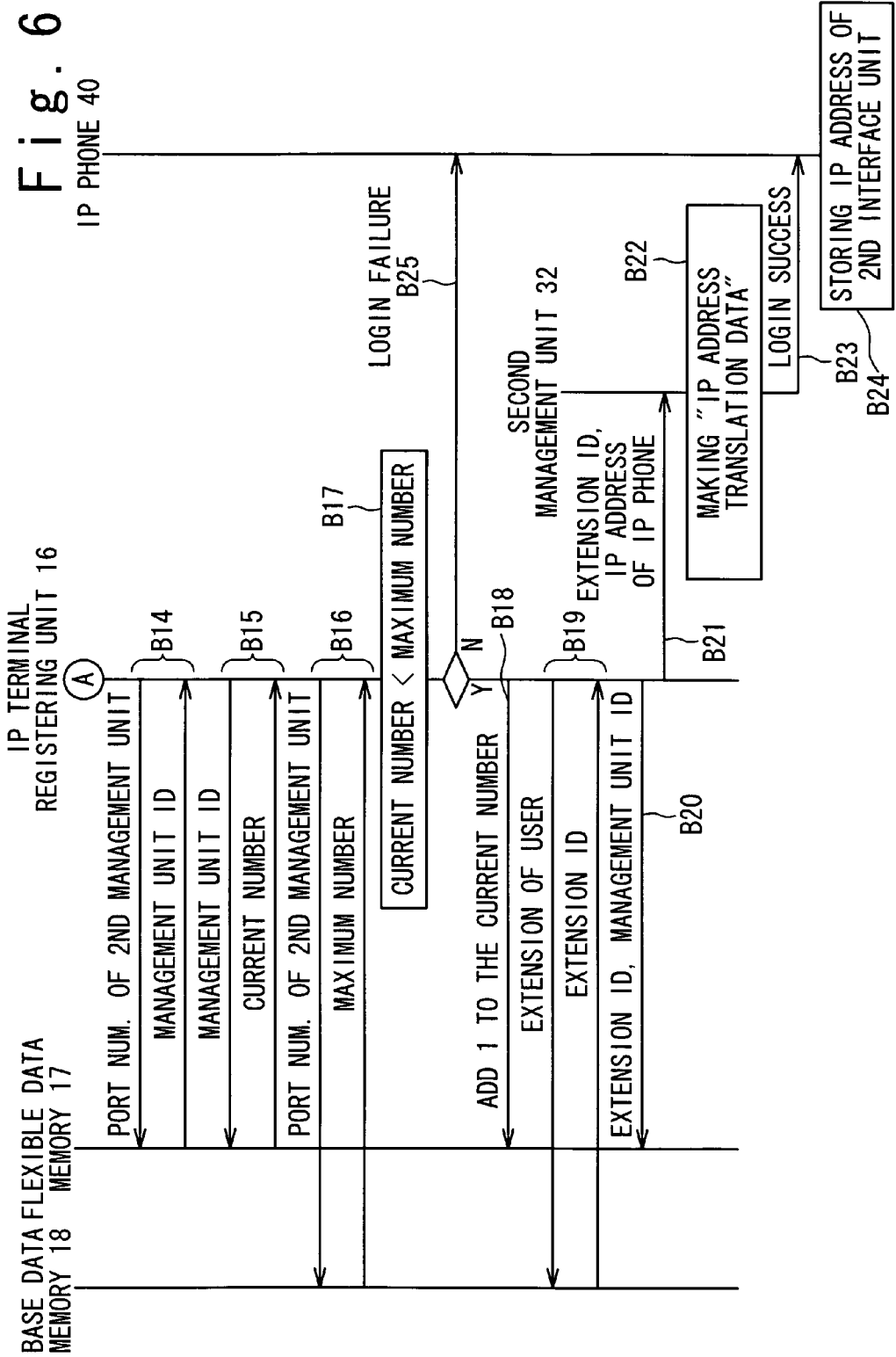
FIG. 6 is a flow chart showing still another operation of the IP-PBX system according to an embodiment of the present invention.

Next, based on the retrieved management unit ID, the IP terminal registering unit 16 retrieves a current number of IP terminals managed by the second management unit 32 from the management unit ID data 63 stored in the flexible data memory 17 (Step B15 in FIG. 6). Then, based on the port number of the second management unit 32, the IP terminal registering unit 16 retrieves the maximum number of IP terminals which can be managed by the second management unit 32 (second number) from the management unit property data 62 stored in the based data memory 18 (Step B16 in FIG. 6). Then, the IP terminal registering unit 16 compares the current number with the second (maximum) number (Step B17 in FIG. 6).

If the current number associated with the second management unit 32 is smaller than the second number (Step B17; Yes), the second management unit 32 is considered to be able to manage the IP phone 40, and the IP terminal registering unit 16 updates the management unit ID data 63 by adding 1 to the current number (Step B18 in FIG. 6). Then, based on the extension of the IP phone 40 (user 1), the IP terminal registering unit 16 retrieves the extension ID of the IP phone 40 from the extension data 61 stored in the base data memory 18 (Step B19 in FIG. 6). Then, the IP terminal registering unit 16 writes the retrieved extension ID and the management unit ID of the second management unit 32 as the matching data 65 into the flexible data memory 17 (Step B20 in FIG. 6). Thus, the IP phone 40 is registered in the second management unit 32.

If the current number associated with the second management unit 32 is equal to the second number (Step B17; No), the similar procedure is executed for another second management unit 32. If there is no second management unit 32 (IP terminal control card 31) available, the login procedure for the IP phone 40 ends in failure. Then, the error signal indicative of the login failure is transferred to the IP phone 40 (Step B25 in FIG. 6).

When the second management unit 32 manages the IP phone 40, the IP terminal registering unit 16 transfers the extension ID and the IP address of the IP phone 40 to the second management unit 32 through the data bus 20 (Step B21 in FIG. 6). The second management unit 32 writes the extension ID and the IP address of the IP phone 40 into the flexible data memory 17 as the IP address translation data associated with the second management unit 32 (Step B22 in FIG. 6). Then, the second management unit 32 transmits a signal indicative of success of the login procedures to the IP phone 40 (Step B23 in FIG. 6).

When receiving that signal, the IP phone 40 stores an IP address of the source of the signal (the second interface unit 34) as a destination IP address (Step B24 in FIG. 6). This destination IP address is used when the IP phone 40 transmits control signals to the IP-PBX 10. Thus, the second management unit 32 becomes able to manage the IP phone 40.

In this manner, the extension of the IP phone 40 (user 1), the IP address of the IP phone 40, and the management unit managing the IP phone 40 are associated with each other. Thus, the user 1 becomes able to use the IP phone 40 in this IP-PBX system according to the present embodiment.

Next, procedures for transmitting a control signal from the main telephony unit 12 to the IP phone 40, 41 will be described below with reference to a flow chart shown in FIG. 7. It should be noted that, in this description, the user 1 uses the IP phone 40 managed by the first management unit 14, and the user 2 uses the IP phone 41 managed by the second management unit 32.

Figure 7:
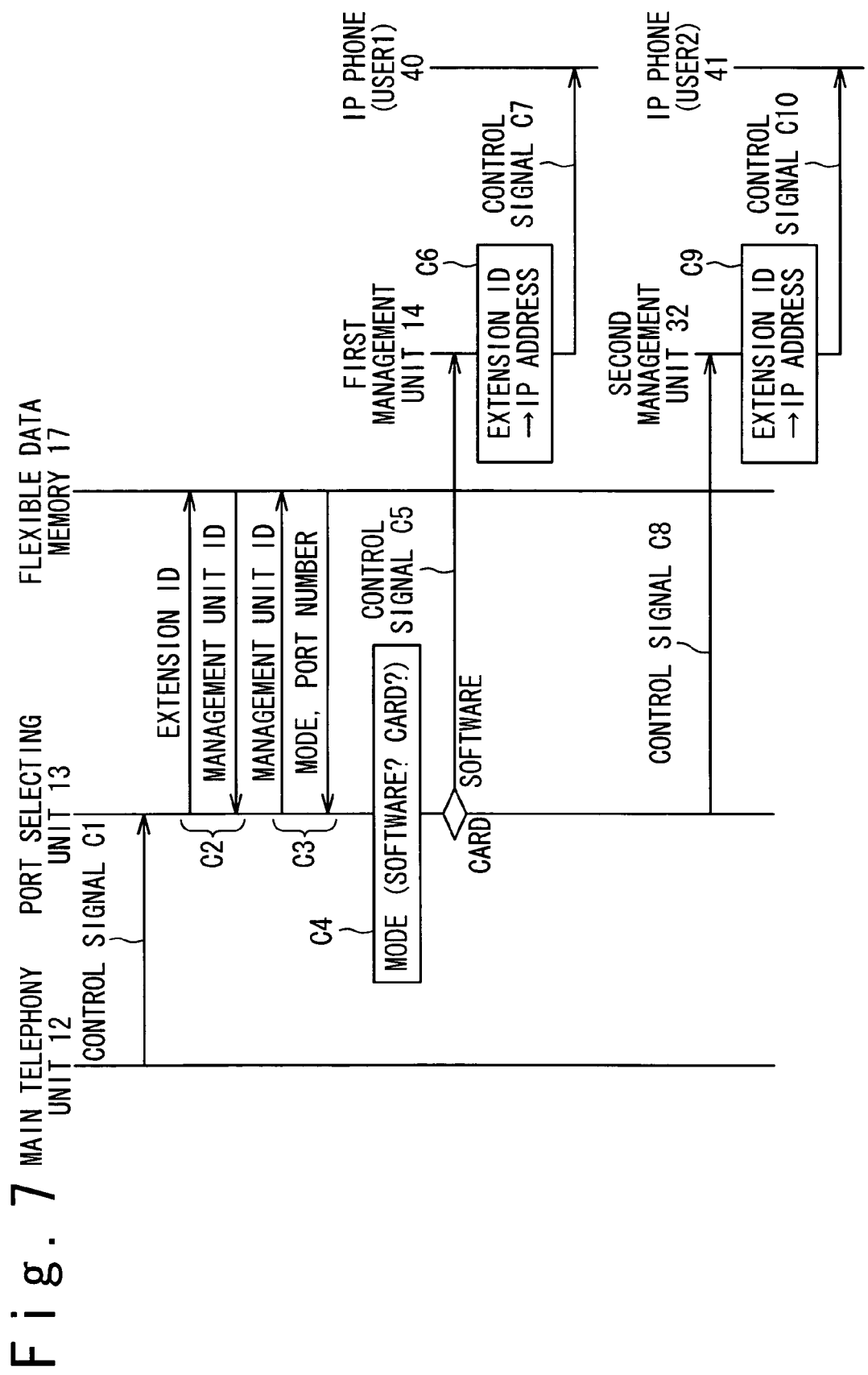
FIG. 7 is a flow chart showing still another operation of the IP-PBX system according to an embodiment of the present invention.

When transmitting a control signal to the IP phone 40 (user 1), the main telephony unit 12 generates a control signal in which the extension ID of the IP phone 40 is specified, and transfers the control signal to the port selecting unit 13 (Step C1 in FIG. 7). Based on the specified extension ID, the port selecting unit 13 retrieves the management unit ID from the matching data 65 stored in the flexible data memory 17 (Step C2 in FIG. 7). Then, based on the retrieved management unit ID, the port selecting unit 13 retrieves the mode and the port number of the management unit from the management unit ID data 63 stored in the flexible data memory 17 (Step C3 in FIG. 7).

Then, the port selecting unit 13 checks the retrieved mode (Step C4 in FIG. 7). In this case, the mode indicates the "built-in software mode". So, the port selecting unit 13 transfers the control signal received from the main telephony unit 12 to the first management unit 14 by referring to the retrieved port number (Step C5 in FIG. 7).

Based on the extension ID specified in the control signal, the first management unit 14 retrieves the IP address of the IP phone 40 from the IP address translation data associated with the first management unit 14 (Step C6 in FIG. 7). By referring to the retrieved IP address, the first management unit 14 transmits the control signal to the IP phone 40 through the first interface unit 15 and the LAN 21 (Step C7 in FIG. 7).

On the other hand, when transmitting a control signal to the IP phone 41 (user 2), the main telephony unit 12 generates a control signal in which the extension ID of the IP phone 41 is specified, and transfers the control signal to the port selecting unit 13 (Step C1 in FIG. 7). Based on the specified extension ID, the port selecting unit 13 retrieves the management unit ID from the matching data 65 stored in the flexible data memory 17 (Step C2 in FIG. 7). Then, based on the retrieved management unit ID, the port selecting unit 13 retrieves the mode and the port number of the management unit from the management unit ID data 63 stored in the flexible data memory 17 (Step C3 in FIG. 7).

Then, the port selecting unit 13 checks the retrieved mode (Step C4 in FIG. 7). In this case, the mode indicates the "card mode". So, the port selecting unit 13 transfers the control signal received from the main telephony unit 12 to the second management unit 32 by referring to the retrieved port number (Step C8 in FIG. 7).

Based on the extension ID specified in the control signal, the second management unit 32 retrieves the IP address of the IP phone 41 from the IP address translation data associated with the second management unit 32 (Step C9 in FIG. 7). By referring to the retrieved IP address, the second management unit 32 transmits the control signal to the IP phone 41 through the second interface unit 34 and the LAN 21 (Step C10 in FIG. 7).

Next, procedures for transmitting a control signal from the IP phone 40, 41 to the main telephony unit 12 will be described below with reference to a flow chart shown in FIG. 8. First, the IP phone 40 transmits a control signal to the IP-PBX 10 by referring to the destination IP address mentioned above. Since the IP phone 40 is being managed by the first management unit 14, the control signal is transferred to the first management unit 14 through the first interface unit 15 (Step D1 in FIG. 8).

Figure 8:
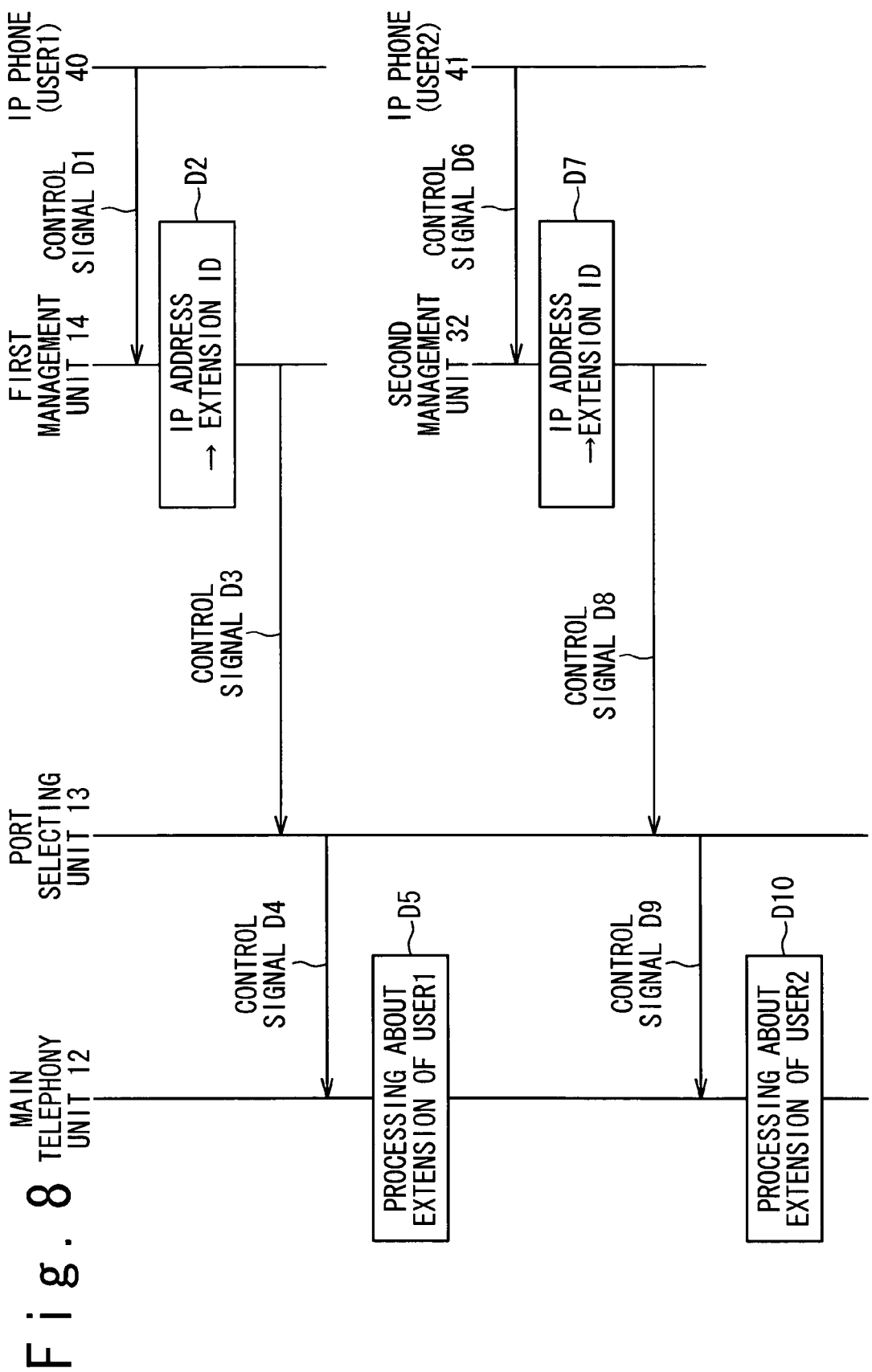
FIG. 8 is a flow chart showing still another operation of the IP-PBX system according to an embodiment of the present invention.

Based on the IP address of the IP phone 40, the first management unit 14 retrieves the extension ID from the IP address translation data (Step D2 in FIG. 8). Then, the first management unit 14 incorporates the retrieved extension ID in the control signal, and transfers the control signal to the port selecting unit 13 (Step D3 in FIG. 8). The port selecting unit 13 transfers the received control signal to the main telephony unit 12 (Step D4 in FIG. 8). When receiving the control signal, the main telephony unit 12 carries out processing with regard to the extension of the IP phone 40 (Step D5 in FIG. 8).

Similar procedures are carried out in the case of the IP phone 41. By referring to the destination IP address mentioned above, the IP phone 41 transmits a control signal to the second management unit 32 through the second interface unit 34 (Step D6 in FIG. 8).

Based on the IP address of the IP phone 41, the second management unit 32 retrieves the extension ID from the IP address translation data (Step D7 in FIG. 8). Then, the second management unit 32 incorporates the retrieved extension ID in the control signal, and transfers the control signal to the port selecting unit 13 (Step D8 in FIG. 8). The port selecting unit 13 transfers the received control signal to the main telephony unit 12 (Step D9 in FIG. 8). When receiving the control signal, the main telephony unit 12 carries out processing with regard to the extension of the IP phone 41 (Step D10 in FIG. 8).

Next, operations of the IP-PBX system according to the present embodiment will be described by referring to concrete values. The concrete values are given in FIG. 9 with the configuration of the IP-PBX system similar to that in FIG. 1. It should be noted that a reference number assigned to a configuration in FIG. 9 is the same as the number assigned to the same configuration shown in FIG. 1.

Figure 9:
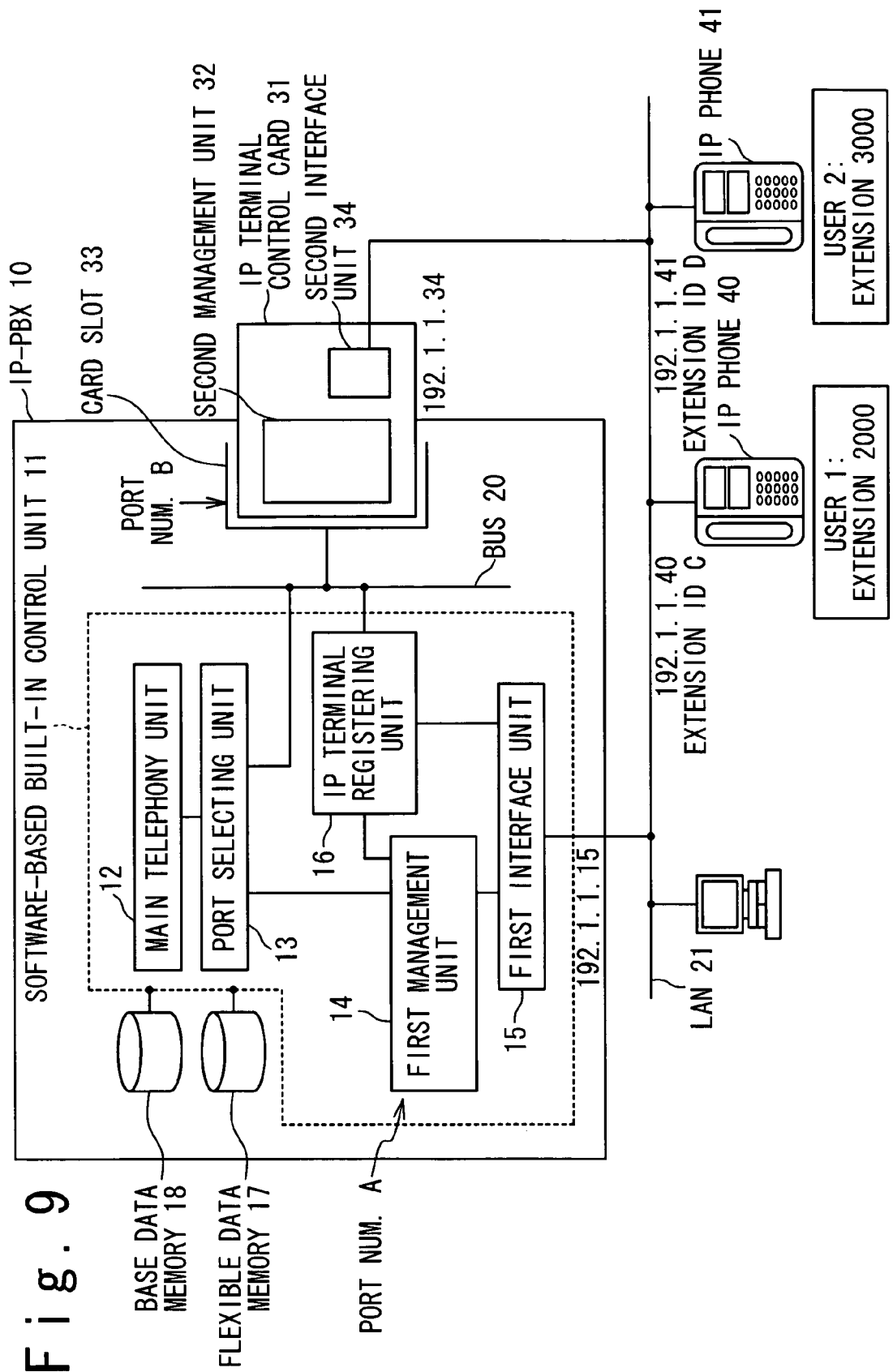
FIG. 9 shows a configuration of an IP-PBX system and concrete values used for explaining an embodiment of the present invention.

In FIG. 9, an IP address of the first interface unit 15 is "192.1.1.15". An IP address of the second interface unit 34 of the IP terminal control card 31 is "192.1.1.34". An IP address of the IP phone 40 is "192.1.1.40". An IP address of the IP phone 41 is "192.1.1.41". An extension of the IP phone 40 (user 1) is "2000". An extension of the IP phone 41 (user 2) is "3000".

Also, in FIG. 9, the port number of the first management unit 14 is "A". The port number of the second management unit 32 is "B", which is the port number of the card slot 33. The extension ID assigned to the IP phone 40 (extension "2000") is "C". The extension ID assigned to the IP phone 41 (extension "3000") is "D".

The operations of the IP-PBX system according to the present embodiment will be described below with reference to flow charts shown in FIGS. 4 to 6. First, the basic data are set to the base data memory 18 by using the maintenance terminal 50. That is to say, the extensions (2000, 3000) and the corresponding extension IDs (C, D) are stored as the extension data 61 in the base data memory 18 (Step A1 in FIG. 4).

Then, the port numbers of management units, modes of the corresponding management units, and the maximum numbers are stored as the management unit property data 62 in the base data memory 18 (Step A2 in FIG. 4). As for the first management unit 14, the mode ("built-in software mode") and the maximum number (first number: 100) are stored in relationship to the port number (A). As for the second management unit 32, the mode ("card mode") and the maximum number (second number: 150) are stored in relationship to the port number (B). After setting the base data, the maintenance terminal 50 transmits a signal indicative of the completion of setting the base data to the IP terminal registering unit 16 of the software-based built-in control unit 11 via the LAN 21 (Step A3 in FIG. 4).

When receiving the signal from the maintenance terminal 50, the IP terminal registering unit 16 assigns an available management unit ID (10) to the first management unit 14, and assigns an available management unit ID (20) to the second management unit 32 (Step A4 in FIG. 4). Then, the IP terminal registering unit 16 writes the management unit ID data 63 into the flexible data memory 17 by referring to the management unit property data 62. That is, the IP terminal registering unit 16 writes the port number (A), the mode ("built-in software mode"), and the number of the managing IP terminals (initial value: 0) in relationship to the management unit ID (10). Similarly, the IP terminal registering unit 16 writes the port number (B), the mode ("card mode"), and the number of the managing IP terminals (initial value: 0) in relationship to the management unit ID (20) (Step A5 in FIG. 4).

Next, the IP terminal registering unit 16 writes the management unit port data 64 into the flexible data memory 17. That is, the IP terminal registering unit 16 writes the management unit ID (10) in relationship to the port number (A) of the first management unit 14, and writes the management unit ID (20) in relationship to the port number (B) of the second management unit 32 (Step A6 in FIG. 4).

Next, a user 1 tries to log-in the IP-PBX 10 by using the IP phone 40, in which the IP phone 40 has its unique extension (2000), extension ID (C) and IP address (192.1.1.40) (Step B1 in FIG. 5). In this case, the IP phone 40 transmits a login-request signal to the IP terminal registering unit 16 through the first interface unit 15 (Step B2 in FIG. 5) by referring to the IP address (192.1.1.15). This login-request signal indicates the extension (2000) of the IP phone 40 (user 1) and the IP address (192.1.1.40) of the IP phone 40.

Then, based on the port number (A) of the first management unit 14, the IP terminal registering unit 16 retrieves the corresponding management unit ID (10) from the management unit port data 64 stored in the flexible data memory 17 (Step B3 in FIG. 5). Next, based on the retrieved management unit ID (10), the IP terminal registering unit 16 retrieves a current number of IP terminals managed by the first management unit 14 from the management unit ID data 63 stored in the flexible data memory 17 (Step B4 in FIG. 5).

Next, based on the port number (A) of the first management unit 14, the IP terminal registering unit 16 retrieves the maximum number (first number: 100) of IP terminals which can be managed by the first management unit 14 from the management unit property data 62 stored in the based data memory 18 (Step B5 in FIG. 5). Then, the IP terminal registering unit 16 compares the current number with the first number (100) (Step B6 in FIG. 5). If the current number is smaller than the first number (100) (Step B6; Yes), for example, if the current number is 50, the first management unit 14 is considered to be able to manage the IP phone 40. Then, the IP terminal registering unit 16 updates the management unit ID data 63 by adding 1 to the current number (Step B7 in FIG. 5), and the current number becomes 51.

Next, based on the extension (2000) of the IP phone 40 (user 1), the IP terminal registering unit 16 retrieves the extension ID (C) of the IP phone 40 from the extension data 61 stored in the base data memory 18 (Step B8 in FIG. 5). Then, the IP terminal registering unit 16 writes the retrieved extension ID (C) and the management unit ID (10) of the first management unit 14 as the matching data 65 into the flexible data memory 17 (Step B9 in FIG. 5). Thus, the IP phone 40 is registered in the first management unit 14.

On the other hand, if the current number is equal to the first number (100) (Step B6; No), the IP phone 40 can not be registered in the first management unit 14. Then, based on the port number (B) of the second management unit 32, the IP terminal registering unit 16 retrieves the corresponding management unit ID (20) from the management unit port data 64 stored in the flexible data memory 17 (Step B14 in FIG. 6). Next, based on the retrieved management unit ID (20), the IP terminal registering unit 16 retrieves a current number of IP terminals managed by the second management unit 32 from the management unit ID data 63 stored in the flexible data memory 17 (Step B15 in FIG. 6).

Next, based on the port number (B) of the second management unit 32, the IP terminal registering unit 16 retrieves the maximum number (second number: 150) of IP terminals which can be managed by the second management unit 32 from the management unit property data 62 stored in the based data memory 18 (Step B16 in FIG. 6). Then, the IP terminal registering unit 16 compares the current number with the second number (150) (Step B17 in FIG. 6). If the current number associated with the second management unit 32 is smaller than the second number (150) (Step B17; Yes), for example, if the current number is 120, the second management unit 32 is considered to be able to manage the IP phone 40. The IP terminal registering unit 16 updates the management unit ID data 63 by adding 1 to the current number (Step B18 in FIG. 6), and the current number becomes 121.

Next, based on the extension (2000) of the IP phone 40 (user 1), the IP terminal registering unit 16 retrieves the extension ID (C) of the IP phone 40 from the extension data 61 stored in the base data memory 18 (Step B19 in FIG. 6). Then, the IP terminal registering unit 16 writes the retrieved extension ID (C) and the management unit ID (20) of the second management unit 32 as the matching data 65 into the flexible data memory 17 (Step B20 in FIG. 6). Thus, the IP phone 40 is registered in the second management unit 32.

If the current number associated with the second management unit 32 is equal to the second number (150) (Step B17; No), the similar procedure is executed for another second management unit 32. If there is no second management unit 32 (IP terminal control card 31) available, the login procedure for the IP phone 40 ends in failure. Then, the error signal indicative of the login failure is transferred to the IP phone 40 (Step B25 in FIG. 6).

When the first management unit 14 manages the IP phone 40, the IP terminal registering unit 16 transfers the extension ID (C) and the IP address (192.1.1.40) of the IP phone 40 to the first management unit 14 (Step B10 in FIG. 5). The first management unit 14 writes the extension ID (C) and the IP address (192.1.1.40) of the IP phone 40 into the flexible data memory 17 as the IP address translation data associated with the first management unit 14 (Step B11 in FIG. 5). Then, the first management unit 14 transmits a signal indicative of success of the login procedures to the IP phone 40 (Step B12 in FIG. 5).

When receiving that signal, the IP phone 40 stores an IP address (192.1.1.15) of the source of the signal (the first interface unit 15) as a destination IP address (Step B13 in FIG. 5). This destination IP address (192.1.1.15) is used when the IP phone 40 transmits control signals to the IP-PBX 10.

When the second management unit 32 manages the IP phone 40, the IP terminal registering unit 16 transfers the extension ID (C) and the IP address of the IP phone 40 (192.1.1.40) to the second management unit 32 through the data bus 20 (Step B21 in FIG. 6). The second management unit 32 writes the extension ID (C) and the IP address of the IP phone 40 (192.1.1.40) into the flexible data memory 17 as the IP address translation data associated with the second management unit 32 (Step B22 in FIG. 6). Then, the second management unit 32 transmits a signal indicative of success of the login procedures to the IP phone 40 (Step B23 in FIG. 6).

When receiving that signal, the IP phone 40 stores an IP address (192.1.1.34) of the source of the signal (the second interface unit 34) as a destination IP address (Step B24 in FIG. 6). This destination IP address (192.1.1.34) is used when the IP phone 40 transmits control signals to the IP-PBX 10.

In this manner, the extension of the IP phone 40 (user 1), the IP address of the IP phone 40, and the management unit managing the IP phone 40 are associated with each other.

Thus, the user 1 becomes able to use the IP phone 40 in this IP-PBX system according to the present embodiment.

Next, procedures for transmitting a control signal from the main telephony unit 12 to the IP phone 40, 41 will be described below with reference to a flow chart shown in FIG. 7. It should be noted that, in this description, the user 1 uses the IP phone 40 managed by the first management unit 14 (management unit ID: 10), and the user 2 uses the IP phone 41 managed by the second management unit 32 (management unit ID: 20).

When transmitting a control signal to the IP phone 40 (user 1), the main telephony unit 12 generates a control signal in which the extension ID (C) of the IP phone 40 is specified, and transfers the control signal to the port selecting unit 13 (Step C1 in FIG. 7). Based on the specified extension ID (C), the port selecting unit 13 retrieves the management unit ID (10) from the matching data 65 stored in the flexible data memory 17 (Step C2 in FIG. 7). Then, based on the retrieved management unit ID (10), the port selecting unit 13 retrieves the mode ("built-in software mode") and the port number (A) of the first management unit 14 from the management unit ID data 63 stored in the flexible data memory 17 (Step C3 in FIG. 7).

Then, the port selecting unit 13 checks the retrieved mode (Step C4 in FIG. 7). In this case, the mode indicates the "built-in software mode". So, the port selecting unit 13 transfers the control signal received from the main telephony unit 12 to the first management unit 14 by referring to the retrieved port number (A) (Step C5 in FIG. 7).

Based on the extension ID (C) specified in the control signal, the first management unit 14 retrieves the IP address (192.1.1.40) of the IP phone 40 from the IP address translation data associated with the first management unit 14 (Step C6 in FIG. 7). By referring to the retrieved IP address (192.1.1.40), the first management unit 14 transmits the control signal to the IP phone 40 through the first interface unit 15 and the LAN 21 (Step C7 in FIG. 7).

On the other hand, when transmitting a control signal to the IP phone 41 (user 2), the main telephony unit 12 generates a control signal in which the extension ID (D) of the IP phone 41 is specified, and transfers the control signal to the port selecting unit 13 (Step C1 in FIG. 7). Based on the specified extension ID (D), the port selecting unit 13 retrieves the management unit ID (20) from the matching data 65 stored in the flexible data memory 17 (Step C2 in FIG. 7). Then, based on the retrieved management unit ID (20), the port selecting unit 13 retrieves the mode ("card mode") and the port number (B) of second the management unit 32 from the management unit ID data 63 stored in the flexible data memory 17 (Step C3 in FIG. 7).

Then, the port selecting unit 13 checks the retrieved mode (Step C4 in FIG. 7). In this case, the mode indicates the "card mode". So, the port selecting unit 13 transfers the control signal received from the main telephony unit 12 to the second management unit 32 by referring to the retrieved port number (20) (Step C8 in FIG. 7).

Based on the extension ID (D) specified in the control signal, the second management unit 32 retrieves the IP address (192.1.1.41) of the IP phone 41 from the IP address translation data associated with the second management unit 32 (Step C9 in FIG. 7). By referring to the retrieved IP address (192.1.1.41), the second management unit 32 transmits the control signal to the IP phone 41 through the second interface unit 34 and the LAN 21 (Step C10 in FIG. 7).

Next, procedures for transmitting a control signal from the IP phone 40, 41 to the main telephony unit 12 will be described below with reference to a flow chart shown in FIG. 8. First, the IP phone 40 transmits a control signal to the first management unit 14 through the first interface unit 15 by referring to the destination IP address (192.1.1.15) mentioned above (Step D1 in FIG. 8).

Based on the IP address (192.1.1.40) of the IP phone 40, the first management unit 14 retrieves the extension ID (C) from the IP address translation data (Step D2 in FIG. 8). Then, the first management unit 14 incorporates the retrieved extension ID (C) in the control signal, and transfers the control signal to the port selecting unit 13 (Step D3 in FIG. 8). The port selecting unit 13 transfers the received control signal to the main telephony unit 12 (Step D4 in FIG. 8). When receiving the control signal, the main telephony unit 12 carries out processing with regard to the extension (2000) of the IP phone 40 (Step D5 in FIG. 8).

Similar procedures are carried out in the case of the IP phone 41. By referring to the destination IP address (192.1.1.34) mentioned above, the IP phone 41 transmits a control signal to the second management unit 32 through the second interface unit 34 (Step D6 in FIG. 8). Based on the IP address (192.1.1.41) of the IP phone 41, the second management unit 32 retrieves the extension ID (D) from the IP address translation data (Step D7 in FIG. 8). Then, the second management unit 32 incorporates the retrieved extension ID (D) in the control signal, and transfers the control signal to the port selecting unit 13 (Step D8 in FIG. 8).

The port selecting unit 13 transfers the received control signal to the main telephony unit 12 (Step D9 in FIG. 8). When receiving the control signal, the main telephony unit 12 carries out processing with regard to the extension (3000) of the IP phone 41 (Step D10 in FIG. 8).

The procedures mentioned above may be described in a set of computer programs, which are executed by a computer.

As described above, the IP-PBX 10 and the IP-PBX system according to the present invention can support both the "card mode" and the "built-in software mode". The priority can be given to either the "built-in software mode" or the "card mode".

When the number of the IP terminals is small or the traffic is light at the time of the introduction of this IP-PBX system, the IP-PBX system can operate only in the "built-in software mode". When the number of the IP terminals and the traffic increase, the IP-PBX system can be extended by plugging an additional IP terminal control card 31 into an empty card slot 33. Here, it is not necessary to prepare excess IP terminal control cards for the IP terminals originally managed in the "built-in software mode".

Also, when the number of the IP terminals is small or the traffic is light at the time of the introduction of this IP-PBX system, the IP-PBX system can operate only in the "card mode". When the number of the IP terminals and the traffic increase, the IP-PBX system can be extended by activating the "built-in software mode". Thus, the manageable IP terminals and the IP-PBX system can be expanded with ease.

Moreover, according to the present invention, it is the port selecting unit 13 that detects which management unit (14, 32) manages an IP terminal. It is also the port selecting unit 13 that detects the mode ("built-in software mode", "card mode") of the management unit which is managing the IP terminal. Therefore, the main telephony unit 12 is able to operate without regard to the management unit which is managing the IP terminal. Thus, the service upgrading or the service addition can be achieved by merely modifying the program which controls the operation of the main telephony unit 12.

It should be noted that the IP terminal is not limited to an IP phone. The IP terminal according to the present invention may include a personal computer with the IP communication facility. Also, the maintenance terminal 50 may be directly connected to the IP-PBX 10 without the LAN 21. Furthermore, the IP-PBX 10 can have a plurality of card slots or a plurality of first interface units 15. A plurality of second interface units 34 and the plurality of first interface units 15 can be connected to different LANs or can be connected to the same LAN 21.

According to the embodiment described above, when the number of IP terminals being managed reaches the first number, i.e., when the traffic excesses the capacity of the first management unit 14, the "card mode" is adopted. Another embodiment is possible. According to the other embodiment, when the number of IP terminals being managed reaches the second number, i.e., when the traffic excesses the capacity of the second management unit 32, the "built-in software mode" is adopted. The priority can be given to either the first management unit 14 or the second management unit 32. The priority is independent of which interface unit (15, 34) receives the login-request signal, but depends on the setting of the IP-PBX 10.

It will be obvious to one skilled in the art that the present invention may be practiced in other embodiments that depart from the above-described specific details. The scope of the present invention, therefore, should be determined by the following claims.

What is claimed is:

1. An Internet protocol private branch exchange comprising:
   a software-based built-in control unit;
   at least one card slot into which a control card is plugged; and
   a data bus connecting said software-based built-in control unit and said card slot,
   wherein said software-based built-in control unit includes:
   a first management unit managing up to a first number of Internet protocol terminals; and
   an Internet protocol terminal registering unit connected to said first management unit and said card slot,
   wherein said control card includes a second management unit managing up to a second number of Internet protocol terminals,
   wherein said Internet protocol terminal registering unit compares a current number of Internet protocol terminals managed by one of said first management unit and said second management unit with a corresponding one of said first number and said second number when an Internet protocol terminal requests communication, said Internet protocol terminal having an identification number and an Internet protocol address,
   wherein, if said current number is smaller than said one number, said Internet protocol terminal registering unit associates said one management unit with said identification number and said Internet protocol address, and said one management unit manages said Internet protocol terminal, and
   wherein, if said current number is equal to said one number, said Internet protocol terminal registering unit associates another of said first management unit and said second management unit with said identification number and said Internet protocol address, and said another management unit manages said Internet protocol terminal.

2. The Internet protocol private branch exchange according to claim 1,
   wherein when said one management unit manages said Internet protocol terminal, said one management unit stores an Internet protocol address translation data indicative of a relation between said identification number and said Internet protocol address of said Internet protocol terminal, and wherein when said another management unit manages said Internet protocol terminal, said another management unit stores an Internet protocol address translation data indicative of said relation between said identification number and said Internet protocol address of said Internet protocol terminal.

3. The Internet protocol private branch exchange according to claim 2, wherein said software-based built-in control unit further comprises:

a main telephony unit; and a port selecting unit connected to said main telephony unit, said one management unit and said another management unit, wherein said main telephony unit generates a control signal which controls said Internet protocol terminal and transmits said control signal to said port selecting unit, wherein said identification number is specified in said control signal, wherein said port selecting unit checks which of said one management unit and said another management unit is managing said Internet protocol terminal, based on said identification number specified in said control signal, wherein said port selecting unit transfers said control signal to a management unit which is managing said Internet protocol terminal, wherein said management unit retrieves said Internet protocol address of said Internet protocol terminal from said Internet protocol address translation data by using said identification number specified in said control signal, and wherein said management unit transmits said control signal to said Internet protocol terminal according to said Internet protocol address.

4. The Internet protocol private branch exchange according to claim 1, wherein the Internet protocol branch exchange further comprises a flexible data memory and a base data memory.

5. The Internet protocol private branch exchange according to claim 4, wherein the base data memory stores data including an extension data and a management unit property data.

6. The Internet protocol private branch exchange according to claim 4, wherein the flexible data memory stores data which are updated automatically according to changes in states of the Internet Protocol terminals.

7. The Internet protocol private branch exchange according to claim 4, wherein the flexible data memory stores a management unit identification data, a management unit port data, and a matching data.

8. The Internet protocol private branch exchange according to claim 7, wherein the management unit identification data indicates the port numbers, the modes, and the numbers of the Internet Protocol terminals currently managed in relationship to the management unit identification of the respective management units.

9. The Internet protocol private branch exchange according to claim 7, wherein the management unit port data indicates the management unit identification in relationship to the respective port numbers of the management units.

10. The Internet protocol private branch exchange according to claim 1, wherein said software-based built-in control unit further comprises a first interface unit connected to the first management unit.

11. The Internet protocol private branch exchange according to claim 10, wherein the software-based built-in control unit connects to a local area network via the first interface unit.

12. The Internet protocol private branch exchange according to claim 10, wherein the Internet protocol terminal registering unit is connected to the first interface unit.

13. The Internet protocol private branch exchange according to claim 1, wherein the Internet protocol terminal registering unit is connected to the second management unit via the data bus.

14. The Internet protocol private branch exchange according to claim 1, wherein said control card further comprises a second interface unit connected to the second management unit.

15. The Internet protocol private branch exchange according to claim 14, wherein said control card and said software-based built-in control unit connect to an local area network via the second interface unit.

16. An Internet protocol private branch exchange system comprising:

an Internet protocol branch exchange;

a plurality of Internet protocol terminals; and a network connecting said Internet protocol branch exchange and said plurality of Internet protocol terminals, wherein said Internet protocol private branch exchange comprises:

a software-based built-in control unit;

at least one card slot into which a control card is plugged; and a data bus connecting said software-based built-in control unit and said card slot, wherein said software-based built-in control unit includes:

a first management unit managing up to a first number of Internet protocol terminals and connected to said network; and an Internet protocol terminal registering unit connected to said first management unit, said card slot and said network, wherein said control card includes a second management unit managing up to a second number of Internet protocol terminals and connected to said network, wherein said Internet protocol terminal registering unit compares a current number of Internet protocol terminals managed by one of said first management unit and said second management unit with a corresponding one of said first number and said second number when one of said plurality of Internet protocol terminals requests communication, said one Internet protocol terminal having an identification number and an Internet protocol address, wherein, if said current number is smaller than said one number, said Internet protocol terminal registering unit associates said one management unit with said identification number and said Internet protocol address, and said one management unit manages said one Internet protocol terminal, and wherein, if said current number is equal to said one number, said Internet protocol terminal registering unit associates another of said first management unit and said second management unit with said identification number and said Internet protocol address, and said another management unit manages said one Internet Protocol terminal.

17. The Internet protocol private branch exchange system according to claim 16, wherein when said one management unit manages said one Internet protocol terminal, said one management unit stores an Internet protocol address translation data indicative of a relation between said identification number and said Internet protocol address of said one Internet protocol terminal, and wherein when said another management unit manages said one Internet protocol terminal, said another management unit stores an Internet protocol address translation data indicative of said relation between said identification number and said Internet protocol address of said one Internet protocol terminal.

18. The Internet protocol private branch exchange system according to claim 17, wherein said software-based built-in control unit further comprises:

a main telephony unit; and a port selecting unit connected to said main telephony unit, said one management unit and said another management unit, wherein said main telephony unit generates a control signal which controls said one Internet protocol terminal and transmits said control signal to said port selecting unit, wherein said identification number is specified in said control signal, wherein said port selecting unit checks which of said one management unit and said another management unit is managing said one Internet protocol terminal, based on said identification number specified in said control signal, wherein said port selecting unit transfers said control signal to a management unit which is managing said one Internet protocol terminal, wherein said management unit retrieves said Internet protocol address of said one Internet protocol terminal from said Internet protocol address translation data by using said identification number specified in said control signal, and wherein said management unit transmits said control signal to said one Internet protocol terminal according to said Internet protocol address.

19. The Internet protocol private branch exchange system according to claim 18, wherein said one Internet protocol terminal transmits a signal to said management unit which is managing said one Internet protocol terminal, wherein said Internet protocol address is specified in said signal, wherein said management unit retrieves said identification number of said one Internet protocol terminal from said Internet protocol address translation data by using said Internet protocol address specified in said signal, and incorporates said identification number in said signal, wherein said management unit transmits said signal to said main telephony unit through said port selecting unit, and wherein said main telephony unit carries out processing with regard to said one Internet protocol terminal according to said identification number specified in said signal.

20. A computer-readable medium encoded with a computer program, said program comprising:

computer readable program code embodied therein configured for controlling an Internet protocol private branch exchange comprising at least one card slot into which a control card is plugged, said control card managing up to a second number of Internet protocol terminals;

computer readable code as a first code configured to cause a computer to manage up to a first number of Internet protocol terminals;

computer readable code configured to cause a computer to compare a current number of Internet protocol terminals managed by one of said first code and said control card with a corresponding one of said first number and said second number when an Internet protocol terminal requests communication, said Internet protocol terminal having an identification number and an Internet protocol address;

computer readable code configured to associate said one of said first code and said control card with said identification number and said Internet protocol address and to have said one of said first code and said control card manage said Internet protocol terminal, if said current number is smaller than said one number; and computer readable code configured to associate another of said first code and said control card with said identification number and said Internet protocol address and to have said another of said first code and said control card manage said Internet protocol terminal, if said current number is equal to said one number.

* * * * *